(12) United States Patent
Bisse et al.

(10) Patent No.: US 10,809,692 B2
(45) Date of Patent: Oct. 20, 2020

(54) CONTROL CONTEXTUALIZATION AND REASONING ABOUT CONTROL

(71) Applicant: Siemens Aktiengesellschaft, Munich (DE)

(72) Inventors: Emmanuel Bisse, Washington, NJ (US); Steffen Lamparter, Feldkirchen (DE); Justinian Rosca, West Windsor, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 207 days.

(21) Appl. No.: 15/738,143

(22) PCT Filed: Jun. 24, 2015

(86) PCT No.: PCT/US2015/037373
§ 371 (c)(1),
(2) Date: Dec. 20, 2017

(87) PCT Pub. No.: WO2016/209221
PCT Pub. Date: Dec. 29, 2016

(65) Prior Publication Data
US 2018/0314225 A1 Nov. 1, 2018

(51) Int. Cl.
*G05B 19/05* (2006.01)

(52) U.S. Cl.
CPC .......... *G05B 19/058* (2013.01); *G05B 19/05* (2013.01); *G05B 2219/14006* (2013.01); *G05B 2219/14083* (2013.01)

(58) Field of Classification Search
CPC ........ G05B 19/058; G05B 2219/14006; G05B 2219/14083
See application file for complete search history.

(56) References Cited

U.S. PATENT DOCUMENTS

| | | | | |
|---|---|---|---|---|
| 8,762,301 | B1 * | 6/2014 | Buckbee, Jr. .......... | G06N 20/00 706/12 |
| 10,148,686 | B2 * | 12/2018 | Hassanzadeh ...... | H04L 63/1441 |
| 2004/0181781 | A1 * | 9/2004 | Tohdo ................ | G05B 19/0426 717/124 |

(Continued)

FOREIGN PATENT DOCUMENTS

| | | |
|---|---|---|
| CN | 102340270 A | 2/2012 |
| CN | 102981445 A | 3/2013 |
| EP | 1452969 A2 | 9/2004 |

OTHER PUBLICATIONS

International Search Report dated Mar. 15, 2016; Application No. PCT/US2015/037373; Filing Date: Jun. 24, 2015; 11 pages.

(Continued)

*Primary Examiner* — Michael J Huntley

(57) ABSTRACT

A method of operating an intelligent programmable logic controller includes executing, by a processor included in the intelligent programmable logic controller, a control program. A non-volatile storage medium included in the intelligent programmable logic controller stores a control model comprising control knowledge related to the control program. The control model is used to perform a monitoring operation related to execution of the control program on the intelligent programmable logic controller.

19 Claims, 19 Drawing Sheets

(56) References Cited

U.S. PATENT DOCUMENTS

| | | | |
|---|---|---|---|
| 2005/0210337 A1* | 9/2005 | Chester | G05B 23/0254 |
| | | | 714/47.2 |
| 2009/0204237 A1* | 8/2009 | Sustaeta | G05B 13/0285 |
| | | | 700/36 |
| 2009/0204267 A1* | 8/2009 | Sustaeta | G06Q 10/04 |
| | | | 700/291 |
| 2015/0262095 A1* | 9/2015 | Rajasekaran | G06Q 10/0635 |
| | | | 705/7.28 |
| 2015/0268655 A1* | 9/2015 | Park | G05B 19/05 |
| | | | 700/86 |

OTHER PUBLICATIONS

Report of Exam dated Sep. 29, 2019; Chinese Patent Application No. 2015800812134; Filing Date: Jun. 24, 2015; 14 pages.

* cited by examiner

FIG. 6

Description: PositioningControl

Eqivalent To ⊕

SubClass Of ⊕

○ ConsistOfPositioningOperators some Main_OB1

○ ConsistOfPositioningOperators some Position_Control_Sim

○ ControlProgram

FIG. 8B ized data and
CONTROL CONTEXTUALIZATION AND REASONING ABOUT CONTROL

This application is a national phase filing under 35 U.S.C. § 371 of International Patent Application No. PCT/US2015/037373, filed Jun. 24, 2015, which is incorporated herein by reference in its entirety.

TECHNICAL FIELD

The present invention relates generally to the use of a programmable logic controller which includes functionality for control contextualization and reasoning about control operations. The disclosed technology may be applied to, for example, various automated production environments where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system. PLCs are utilized in various industrial settings to control automation systems.

Conventional PLC programming is done using tools for graphical or textual specification of code (see, e.g., IEC 61131-3), and knowledge about program variables including I/O mappings, program organization units such as function blocks. Control flow is left behind in comments in the source code and is not captured for runtime diagnostics processes. Simultaneously, a historian can record the state of the process at run time (such as inputs and outputs, or variables representing the internal state of the control program), but there is no way statistical information about program execution can be linked to symbolic information representing the code. As a result, there is no way to understand whether program execution is erroneous, inefficient, imprecise, risky, or unfit to the actual real-world input data and context.

Developing new capabilities to capture such knowledge about the control program would meet the demand to understand control execution, offer additional guarantees and runtime intelligence, and potentially optimize execution during runtime, enhancing the value of historized data and preserved context.

SUMMARY

Embodiments of the present invention address and overcome one or more of the above shortcomings and drawbacks, by providing methods, systems, and apparatuses related to a PLC which includes a control model representing knowledge about the control program and its iteration with other system components. This control model may be used, for example, to reason about symptoms of error conditions and to perform root cause analysis.

According to some embodiments of the present invention, a method of operating an intelligent programmable logic controller includes executing, by a processor included in the intelligent programmable logic controller, a control program. A non-volatile storage medium included in the intelligent programmable logic controller stores a control model comprising control knowledge related to the control program. The control model is used to perform a monitoring operation related to execution of the control program on the intelligent programmable logic controller.

Various monitoring operations may be used with the aforementioned method. For example, in some embodiments, the monitoring operation comprises monitoring one or more controller variable(s) during execution of the control program. In some embodiments, the monitoring operation also includes the monitoring of one or more controller functions during execution of the control program.

Additional features, enhancements, or modifications may be made to the aforementioned method in different embodiments. For example, in one embodiment, the method further comprises identifying one or more faults in the control program using the control model. In other embodiments, the method includes debugging the control program using the control model. In still other embodiments, the method includes adjusting one or more algorithms included in the control program based on the control model.

In some embodiments of the aforementioned method, the control model is automatically extracted from program code in an engineering development environment. The control model may include for example, structural information related to program functions used by the control program and control flow information related to the program functions. Additionally (or alternatively), the control model may include dependency information relating process variables and variables used by the control program. Also, in some embodiments, the control model further includes key performance indicator (KPI) definitions related to the control program.

According to another aspect of the present invention, as described in some embodiments herein, an article of manufacture for operating an intelligent programmable logic controller comprises a non-transitory, tangible computer-readable medium holding computer-executable instructions for performing the aforementioned method. The computer-executable instructions may be configured to perform the aforementioned method, with or without the additional features discussed above.

According to other embodiments of the present invention, a programmable logic controller includes a non-volatile computer-readable storage medium and one or more processors. The non-volatile computer-readable storage medium stores a control model comprising control knowledge related to a control program. The processors are configured to: execute the control program according to a scan cycle and use the control model to perform a monitoring operation related to execution of the control program. The implementation of the monitoring operation can vary across different embodiments. For example, in some embodiments, the monitoring operation comprises monitoring one or more controller variable(s) during execution of the control program. In some embodiments, the monitoring operation further comprises monitoring one or more controller functions during execution of the control program. Moreover the processors used in the aforementioned programmable logic controller can vary in functionality. For example, in one embodiment, the processors are further configured to adjust one or more algorithms included in the control program based on the control model.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 6 shows SCL Code for repositioning during oscillations, as it may be implemented in some embodiments;

FIG. 8B shows a formal definition of a Positioning Control program using existential quantification, as may be used in some embodiments;

DETAILED DESCRIPTION

Figure 1:
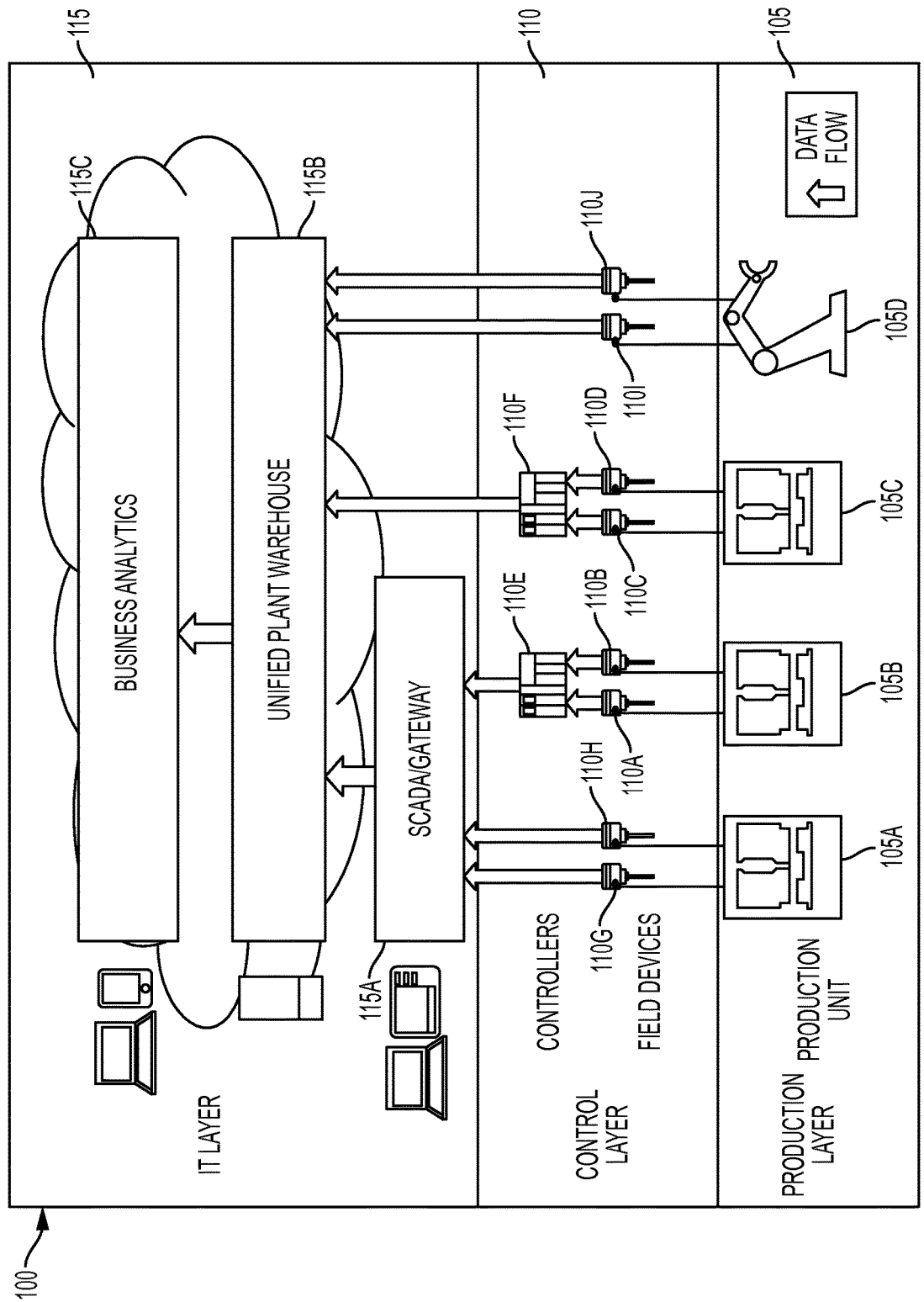
FIG. 1 provides a system view of an Intelligent PLC integrated into an automation system, according to some embodiments of the present invention.

Systems, methods, and apparatuses are described herein which relate generally to an Intelligent PLC (described below) which includes functionality for control contextualization and reasoning about control. More specifically, the various embodiments described herein describe the development, implementation, and use of a control model that represents information about the control programs that run on the controlling PLCs and about the interfaces to embedded controllers that operate devices. The control model supports the operational understanding of the system and data analysis, using semantic annotation of embedded control programs. This control model may include, for example, knowledge about the structure of control program functions, the control flow of the program blocks, dependencies of process variables and control variables and Key Performance Indicator (KPI) definitions about control quality and monitoring rules.

The various techniques described herein provide several benefits over existing PLC technologies. For example, the control model is available and accessible on the controller device. In some embodiments, the control model is explicitly represented by a formal knowledge representation. This makes reasoning about control context within device possible. The control model and reasoning can be used within device to, for example, monitor PLC variables and underlying assets/processes, detect and diagnose faults, debug/diagnose control programs, tune/optimize control algorithm, and optimize operations. Control knowledge can be used to automatically configure monitoring and optimization algorithms on PLC. Additionally, in some embodiments, control model can be automatically extracted from program code available in engineering development environment.

Various embodiments of the present invention are described in the context of a PLC which includes various components configured to provide an assortment of enhanced functions in control applications. This PLC, referred to herein as an "Intelligent PLC" is described in greater detail in U.S. application Ser. No. 14/467,125 entitled "Intelligent Programmable Logic Controller," the entirety of which is incorporated herein by reference. Briefly, the Intelligent PLC offers several technical features which may be present in various combinations and used in different embodiments of the present invention. The Intelligent PLC provides efficient data storage on control layer devices. More specifically, functionality of the control layer may be extended by an efficient storage mechanism for time series data (i.e., a "historian" function) which allows short-/mid-term archiving of high resolution time-stamped data. With high fidelity data, no events are lost. Efficient compression algorithms (e.g. a variation of swinging door) may be used to reduce storage and communication demands. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

FIG. 1 provides a system view of an Intelligent PLC integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 110 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Additionally, in some embodiments, the Intelligent PLCs 110E and 110F provide data analytics functionality directly on their respective device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor, a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field device known in the art may be used with the Intelligent PLC described herein. Examples of field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 1, Production Units 105B and 105C are connected through their respective field devices to Intelligent PLCs 110E and 110F, while Production Units 105A and 105D communicate directly through their respective Field Devices 110G, 110H, 110I, 110J to the Unified Plant Knowledge Warehouse 115B.

The Intelligent PLCs 110E and 110F may enrich data using additional context dimensions compared to state of the art systems (e.g., control knowledge, environmental conditions, and service incidences). This allows insights to be made from data analytics with higher confidence and quality. In some embodiments, the system 100 uses semantic data representation languages and standards for contextualization of data in automation systems. This allows business analytics as well as SCADA-level historians (e.g., OSI PI asset framework) to be configured with minimal effort for integration with data from other systems/devices/sources. Also the system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

In addition to the typical sensor inputs and control outputs transferred to the IT Layer 115 or the Production Layer 105, the Intelligent PLCs 110E and 110F may store, utilize, and historize local control-layer parameters and variables, which in conventional automation systems are hidden inside the Control Layer 110.

Figure 2:
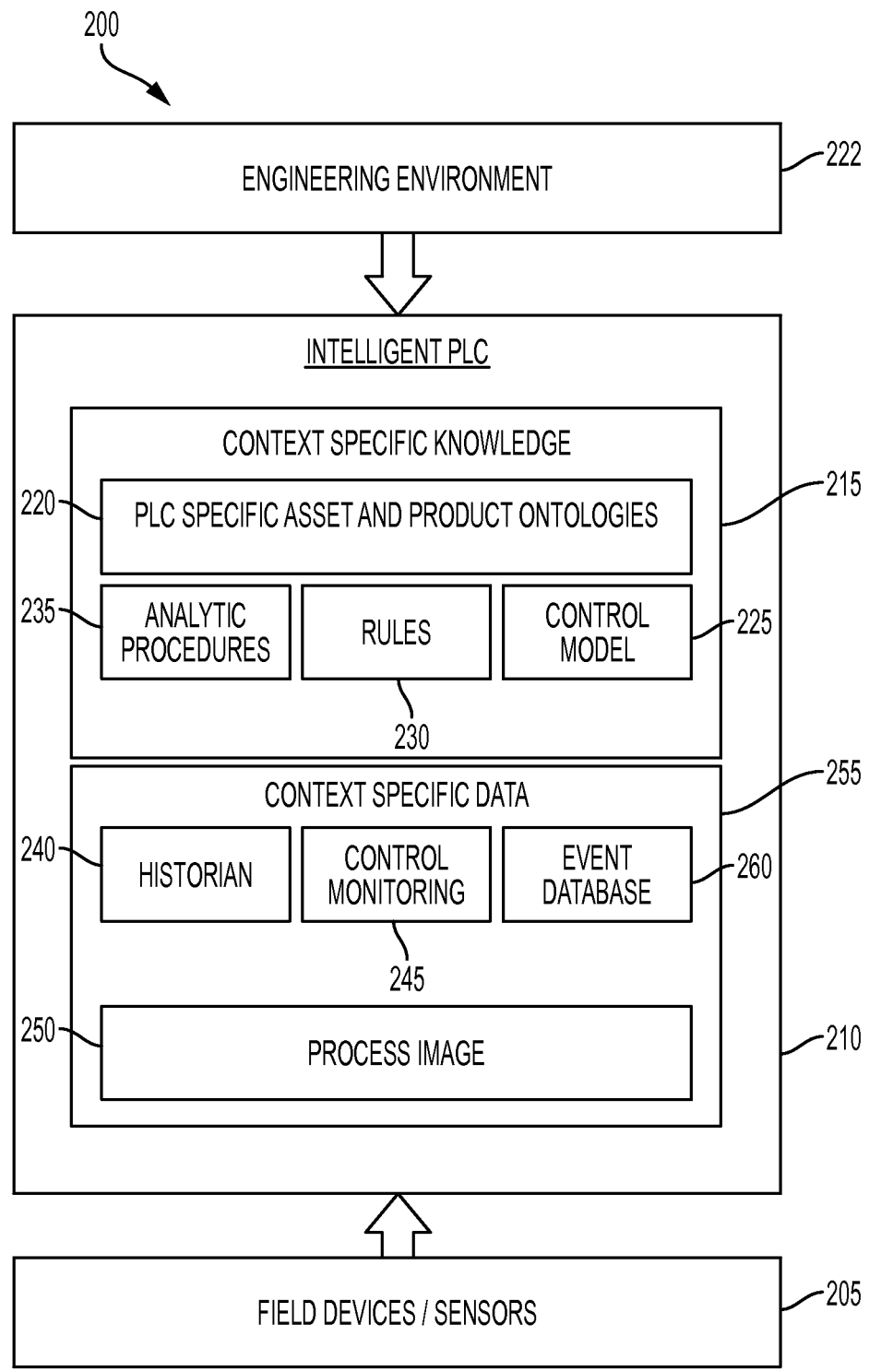
FIG. 2 illustrates information sources in an Intelligent PLC, according to some embodiments.

FIG. 2 illustrates information sources 200 in an Intelligent PLC 210, according to some embodiments. Field Devices/Sensors 205 represents inputs to the Intelligent PLC 210. The Field Devices/Sensors 205, as well as the Process Image 250, represents data that can be processed. The Engineering Environment 222 (e.g., TIA Portal from Siemens) is used to define, debug, and tune the control program that will run on the Intelligent PLC 210. The Engineering Environment 222 may include, for example, Control Program in TIA, Product Asset Framework, and Alert Mechanisms. Knowledge and information elicited in the process can be captured, organized, transferred to the Intelligent PLC 210 from the Engineering Environment 222, and exploited at run time.

A control program (not shown in FIG. 2) executes on the Intelligent PLC 210. Context Specific Knowledge (CSK) 215 makes all the data and procedures related to that control program symbolically addressable. The CSK 215 utilizes Context Specific Data 255 and metadata to be preserved locally by the Intelligent PLC 210. This data and metadata in the CSK 215 may comprise, for example, I/O variables, global, direct, external and temporary variables and their context, time, and derived data descriptions. Also, the functional context given by functions, function blocks, and organization blocks both statically and dynamically may also be captured by the CSK 215. This may also comprise analytic procedures available to process the Intelligent PLC 210 data and create new smart data, procedures to create and manage events, and the Intelligent PLC 210 specific ontologies such as the asset and control models. It should be noted that this includes a new source of information regarding the control program deployed on the Intelligent PLC 210, the control model.

The Context Specific Data 255 used by the CSK 215 is obtained from four sources in the example of FIG. 2: a Historian Component 240, a Control Monitoring Component 245, Event Database 260, and the Process Image 250. The Process Image 250 of each cycle is read and permanently stored on a non-volatile physical storage medium by the Historian Component 240. In some embodiments, this Historian Component 240 is configured to deploy data compression algorithms to reduce data volume. It thereby can provide applications with access to past process images. Data may be stored either for a fixed time window or online algorithms and are used to realize dynamic caching heuristics. As part of the Historian Component 240, intelligent data generation algorithms may continuously analyze the process image and context to adjust data generation parameters (e.g., sampling rate) of connected I/Os. The Control Monitoring Component 245 uses the Control Model 225 (described below) to perform monitoring operations on the control program executed by the Intelligent PLC 210 (e.g., monitoring variables or functions). Based on this monitoring, the Control Monitoring Component 245 may perform operations such as generating alarms and other events related to the operation of the Intelligent PLC 210. Events may be stored in an Event Database 260 until processed by the CSK 215 and other higher-layer components of the Intelligent PLC 210 (or external components).

Context models at control level represent information about the control programs that run on the controlling Intelligent PLCs and about the interfaces to embedded controllers that operate devices. It relates inputs, outputs, parameters, and other variables as well as operations that are carried out in specific control program modules, for example, control loops of a proportional-integral-derivative controller. Also, this information includes knowledge about the performance goals of a controller or the physical dependencies that affect different controllers. The information is targeted at, for example, enabling online monitoring and optimization of the controller behavior retaining control and plant model information as necessary and leveraging connections between descriptions of basic automation system components and PLC-specific context models (e.g. control programs).

The CSK 215 includes Asset and Product Ontologies 220 which are specific to the particular controller and used to describe the topology of the automation system and production equipment as well as the structure/genealogy of the product. As is well understood in the art, ontologies are explicit formal specifications of the terms in a domain (concepts) and the relationships among them. Various standards may be used for expressing the Asset and Product Ontologies 220 including, without limitation, the Web Ontology Language (OWL), the Resource Description Framework (RDF), and/or OPC-UA information models. Declarative descriptions of Rules 230 and Analytical Procedures 235 formalize the algorithms used for analyzing the data.

The Control Model 225 includes knowledge about the control program executed by the Intelligent PLC 210 and its internal dependencies. In some embodiments, the Control Model 225 is automatically generated at engineering time (see, e.g., the description of FIGS. 5A-5C). In other embodiments, it may be manually specified by an engineer. The Control Model 225 is a formal knowledge representation and reasoning framework that is able to capture knowledge specified, for example, in IEC 61131 and in typical programming environments such as Step 7 or CoDeSys. The Control Model 225 may also integrate procedural knowledge and reasoning about time dimension of control and data. Also, it may provide mechanisms to support both the interactive and automatic addition of new symbols representing hidden control information.

The Control Model 225 declaratively describes the relation between inputs and outputs by considering information such as, without limitation, controller and process inputs and outputs (e.g. sensory signals and the control signals sent to actuators); estimated variables describing the process dynamics which are not directly measurable; Key Performance Indicators (KPIs) defining the desired performance of the input/output and possibly system states; alarms automatically detected during run-time analysis of the input/output data and/or in system states; and causality relationship between variables or alarms.

In some embodiments, the Control Model 225 includes a KPI model that maps knowledge from program development tools that assist engineers in control design to control performance analysis and dependency detection between multiple control components (e.g., interference between several control loops). It contains information about control performance indicators and how they influence the underlying control model components. Such KPIs may be measured with respect to several characteristics including, without limitation, variability (e.g. standard deviation of error); operator activity (e.g., percentage of time in manual operation mode); and quality (e.g., integral of absolute error, oscillation index, settling time, etc.).

In some embodiments, the Intelligent PLC 210 may include additional components allowing users to determine diagnostic information from the Intelligent PLC 210 during execution of the control program. For example, in some embodiments, an interface is provided which allows the user to perform code tracing or debugging analysis using the knowledge embedded in the Control Model 225. This may be used to quickly understand fault conditions and aid in the determination of root cause. For example, graphical representations of the control program functions and/or variables (see, e.g., FIGS. 7A-7C) may be displayed on a human machine interface (HMI) in the operation environment. Alternatively (or additionally), the information may be provided to engineers automatically or in response to an operator request. This allows engineers to quickly detect and correct any issues in the control program.

Figure 3:
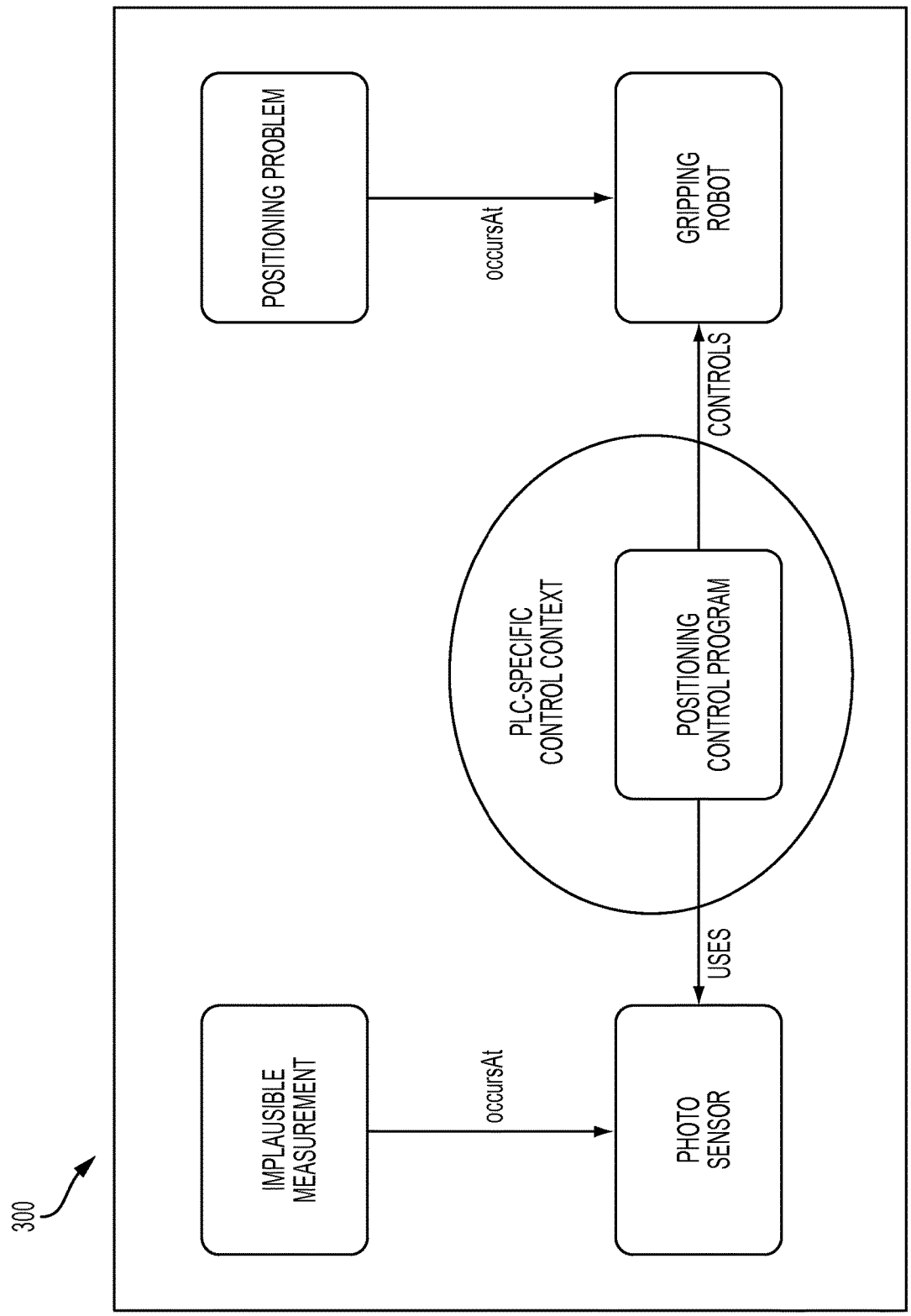
FIG. 3 provides an example illustration of how control context knowledge provided by a Control Model may be used by an Intelligent PLC to adjust operations in an automation environment, using some of the techniques described herein.

FIG. 3 provides an example scenario 300 of how control context knowledge provided by a Control Model may be used by an Intelligent PLC to adjust operations in an automation environment, using some of the techniques described herein. In this example, a control program fails to meet the set point of a robot position in a dedicated control loop because of noisy sensor inputs. Using the control context knowledge about dependencies between sensor input and output of robot control instructions, the fault is traced back to the noisy sensor, thus enabling quick repair operations to be performed without inspection of robot defects or control misconfigurations. As shown in FIG. 3, a positioning problem event occurs at a gripping robot and—via PLC-specific control context—there is a connection to an implausible measurement event at the noisy photo sensor.

Intelligent PLCs can include control context knowledge at event generation, where high-level events are enriched with connected context in order to provide meaning, i.e. they can be directly interpreted at control level. This control context would normally be lost and not available for various analytics scenarios. However, analytics in the Intelligent PLC directly benefit from this linked event context. Additionally, advanced context knowledge enables real-time deployment of control monitoring rules that are automatically pushed down to the right control parameters without manual configuration. Analytic functions can use these rules in combination with historian data to perform real-time control optimization.

Since control performance indicators are closely related to enterprise KPIs, automation design can be flexible with respect to changing market conditions. For example, consider an automation system, where one Intelligent PLC is used to run several PID control loops and the control engineers decide, because of an increasing number of quality issues, to measure the control loop performance with respect to variability. Therefore, they select a corresponding KPI (e.g., via a graphical user interface), which then automatically deploys a variability monitoring rule at every applicable control variable. Monitoring these measurements means that they are stored in the Intelligent PLC's local Historian Component 240, enabling trend visualization and the usage of more advanced analytics. The wealth of context specific information at the PLC level can thus be employed to enhance the explanation capabilities for the control models leveraging modern Artificial Intelligence (AI) knowledge representation and reasoning/deduction techniques. Furthermore, this can add flexibility in exploiting new specialized analytic functions, changing or removing components without impacting the overall system. A variety of HMI, SCADA and MES capabilities could be significantly enhanced.

Based on the understanding how process image data maps to logical names and, consequently, control program code, direct relations between variables can be extracted based on the program code (e.g., specified in SCL, Ladder Logic, etc.). For example, the following are examples of elements that may be of interest: the structure and organization of the program blocks; the relationship between the program blocks (e.g., inputs/outputs, etc.); the control flow of the program blocks (e.g., timer-based cyclic execution); the parameters of the program blocks (e.g., temporary and global variables, etc.); the language constructs within a program block (e.g., LOOP, comments, etc.); the dependencies between the variables within the entire control program. Each of these items are viewable during engineering time as illustrated in the example FIGS. 4A-4C below.

Figure 4A:
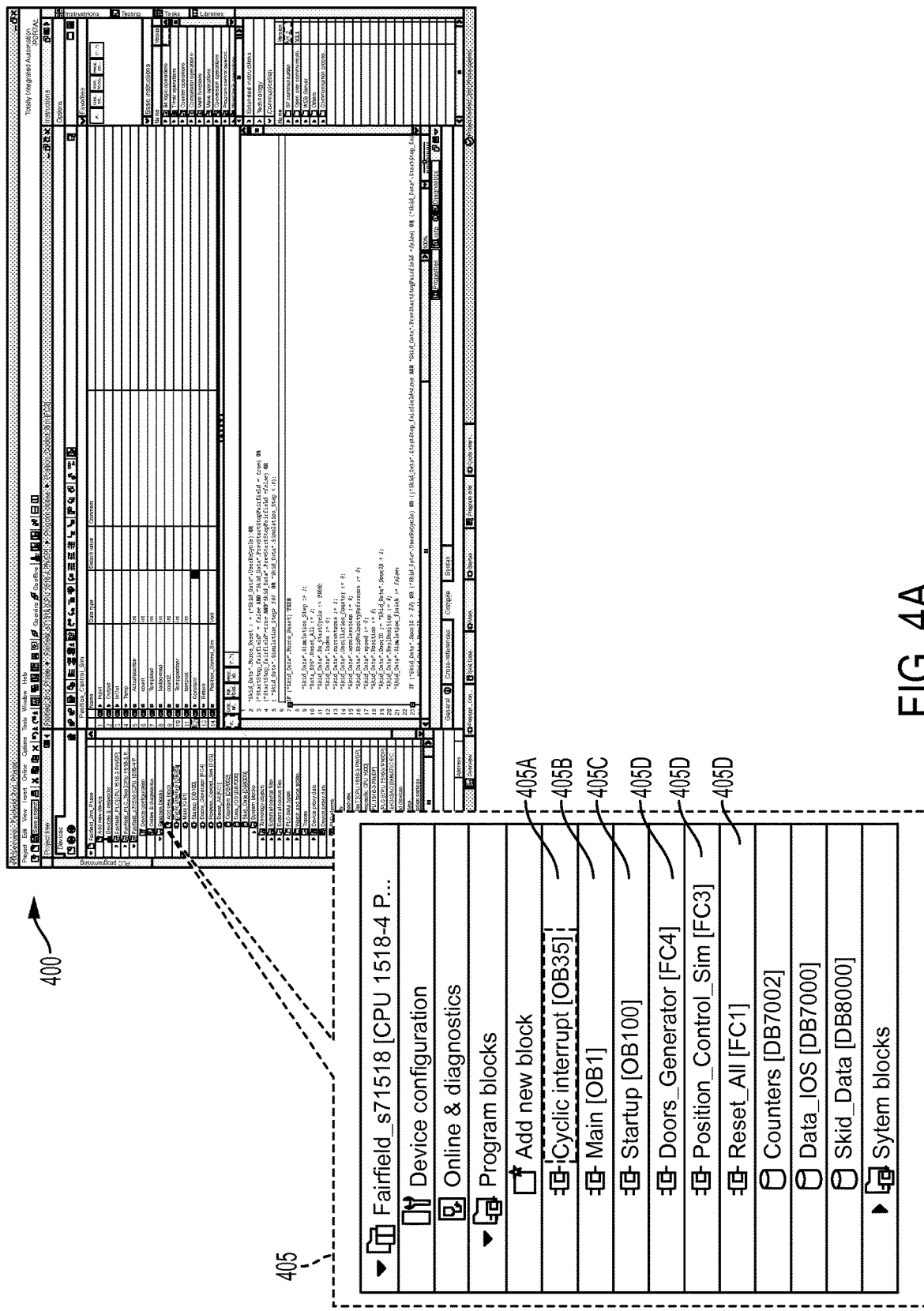
FIG. 4A shows a graphical development environment for the Siemens TIA engineering system, as may be utilized in some embodiments.

The figures described below provide concrete examples of a positioning control program for an automotive body shop door assembly process programmed in the Siemens Totally Integrated Automation (TIA) engineering system. These examples illustrate how the corresponding control models can be extracted out of this control program. It should be understood that the general concepts described below can be extended to the control modeling of any automation process. Thus, the various variables, functions, and features which are specific to the door assembly process are not necessarily utilized in other embodiments of the invention where such items would not be applicable. Additionally, it should be noted that the use of the Siemens TIA engineering system tools is but one example of the engineering tools that can be used in implementing the various techniques described below FIG. 4A shows a graphical development environment 400 for the Siemens TIA engineering system. Callout 405 shows an enlarged portion of the graphical development environment 400 which includes a list of basic program blocks for this control program. Cyclic Interrupt Program Block 405A contains the main positioning program executed at every OB35 cycle, 100 ms. In the program, the inputs (e.g., positions from the sensor reading) are evaluated and the adjusted speed and acceleration are calculated and the outputs (e.g. new speed command) are sent out. Main Program Block 405B specifies that the main positioning program is executed in an OB35 (i.e., the control cycle at 500 ms). A cyclic control program can also run in the Main Program Block 405B. Startup Program Block 405C runs in an OB100 when the PLC is switched from STOP to RUN mode. Initialization tasks such as reset global variables may be performed by the Startup Program Block 405C. In case of an error event, one or more Error Program Blocks 405D is executed. A user code to respond to the errors (e.g. acknowledge or stop the control) should be executed in the error OBs.

Figure 4B:
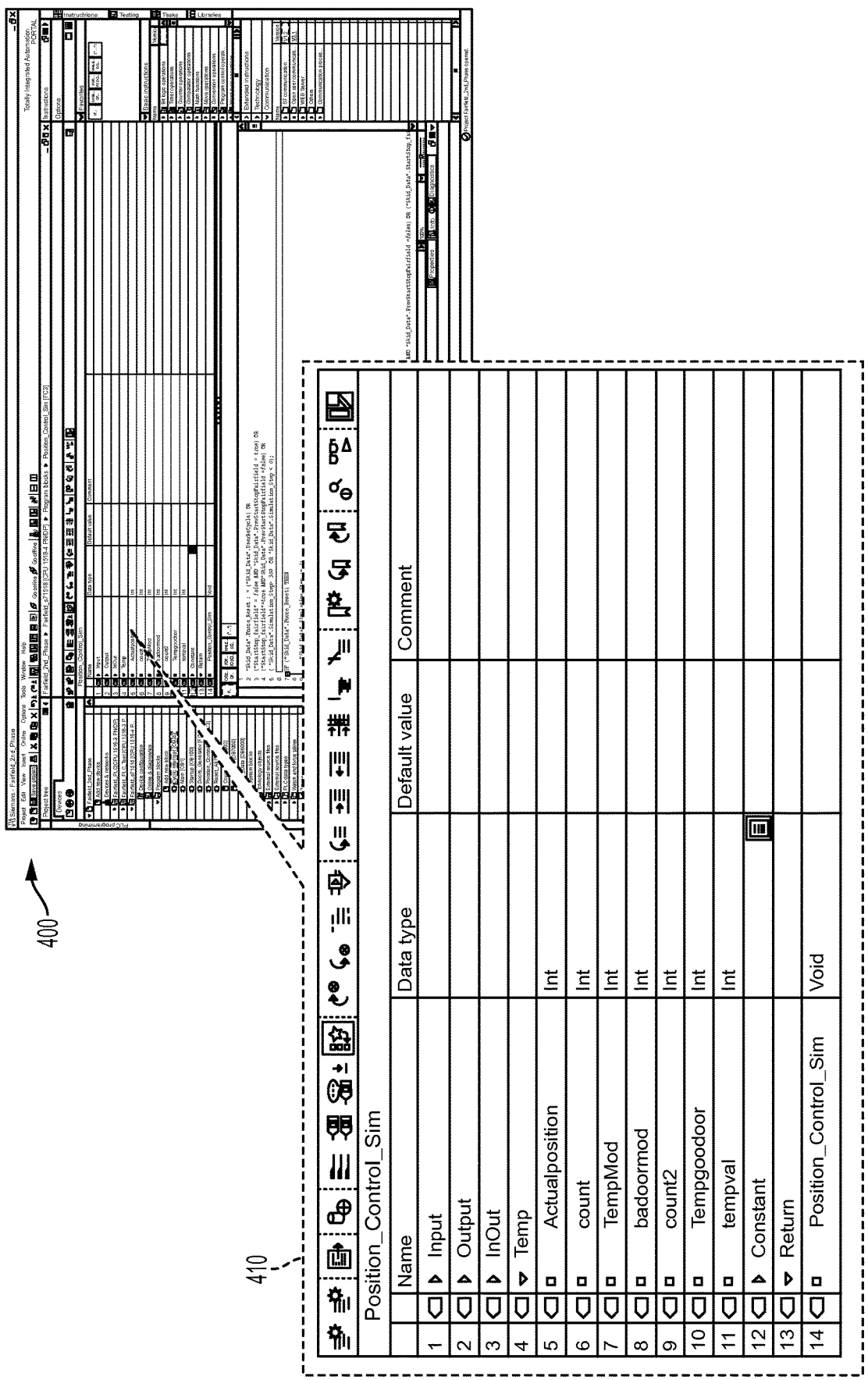
FIG. 4B shows another view of the graphical development environment, with a callout to show an example program block, as may be implemented in some embodiments.
Figure 4C:
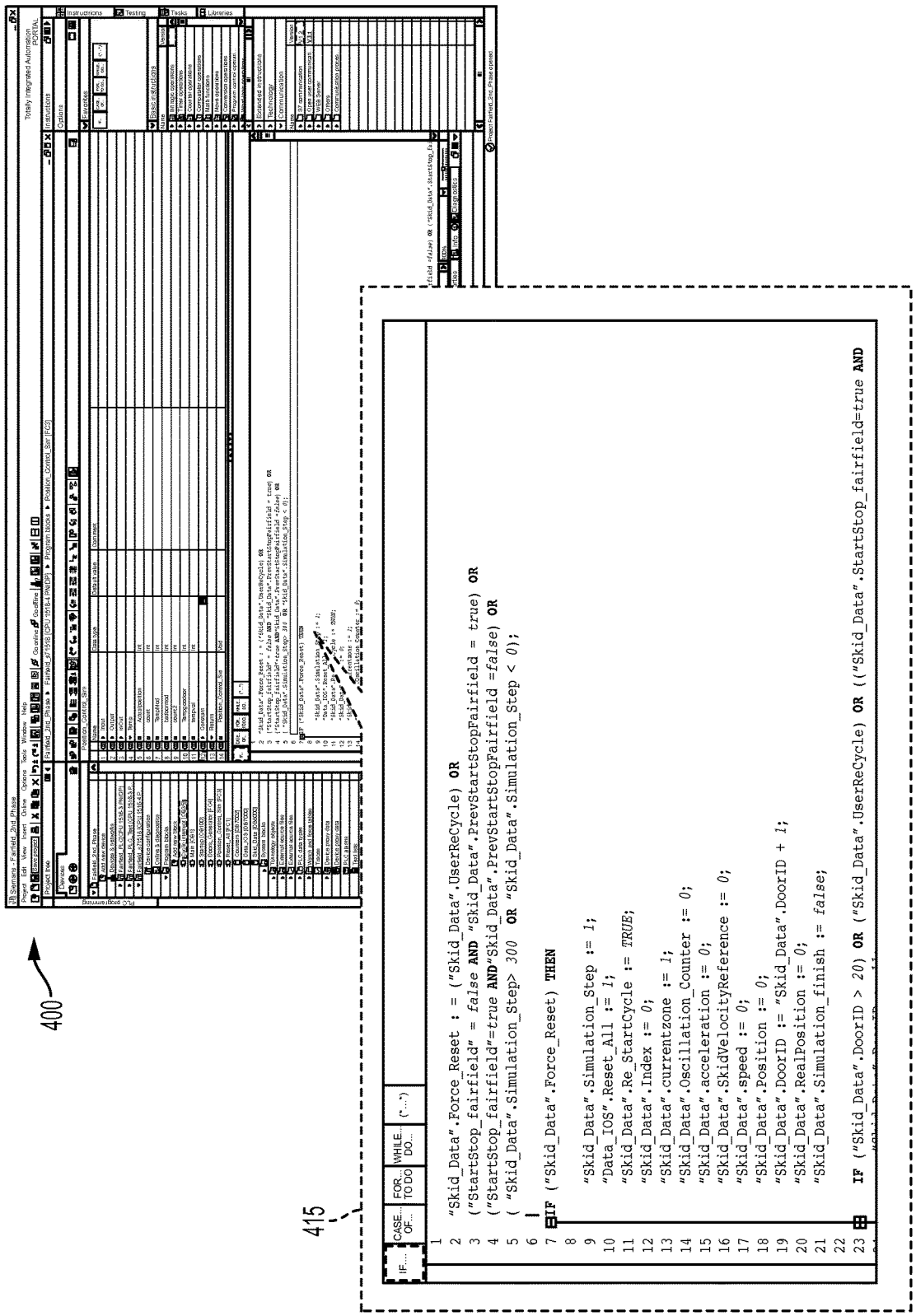
FIG. 4C shows a callout highlighting the lower portion of the graphical development environment where the coding area for the example program block shown in FIG. 4B is presented.

FIG. 4B shows another view of the graphical development environment 400. Callout 410 shows parameters for an example program block. These parameters include input, output, inout, temporary variables, constants, and return values. Additional parameters (e.g., global variables) may also be specified in some embodiments. FIG. 4C shows a Callout 415 highlighting the lower portion of the graphical development environment 400 where the coding area for the example program block shown in FIG. 4B is presented.

Figure 5A:
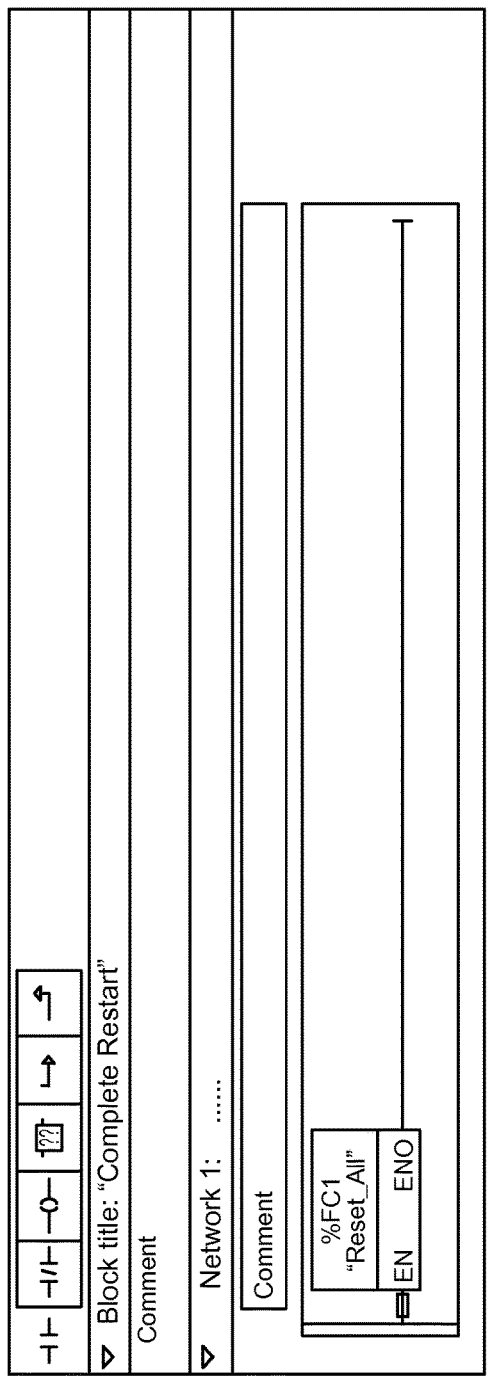
FIG. 5A shows the ladder diagram for OB100—complete restart program, as may be used in some embodiments.
Figure 5B:
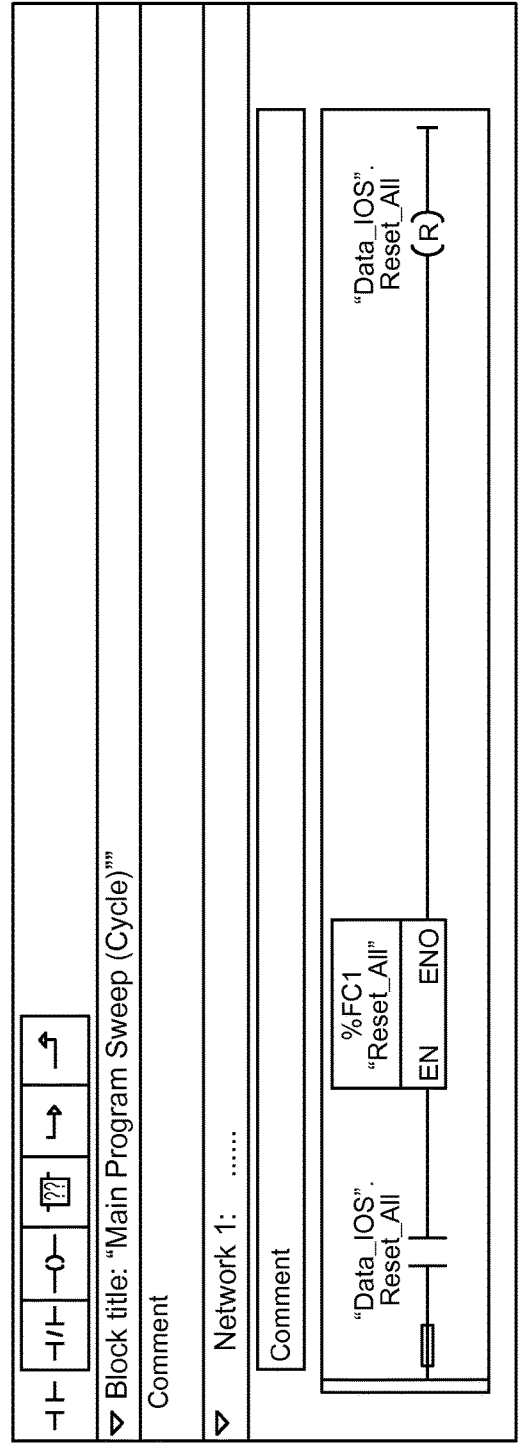
FIG. 5B provides an illustration of the ladder diagram for OB1—Main Program Cycle, as may be used in some embodiments.
Figure 5C:
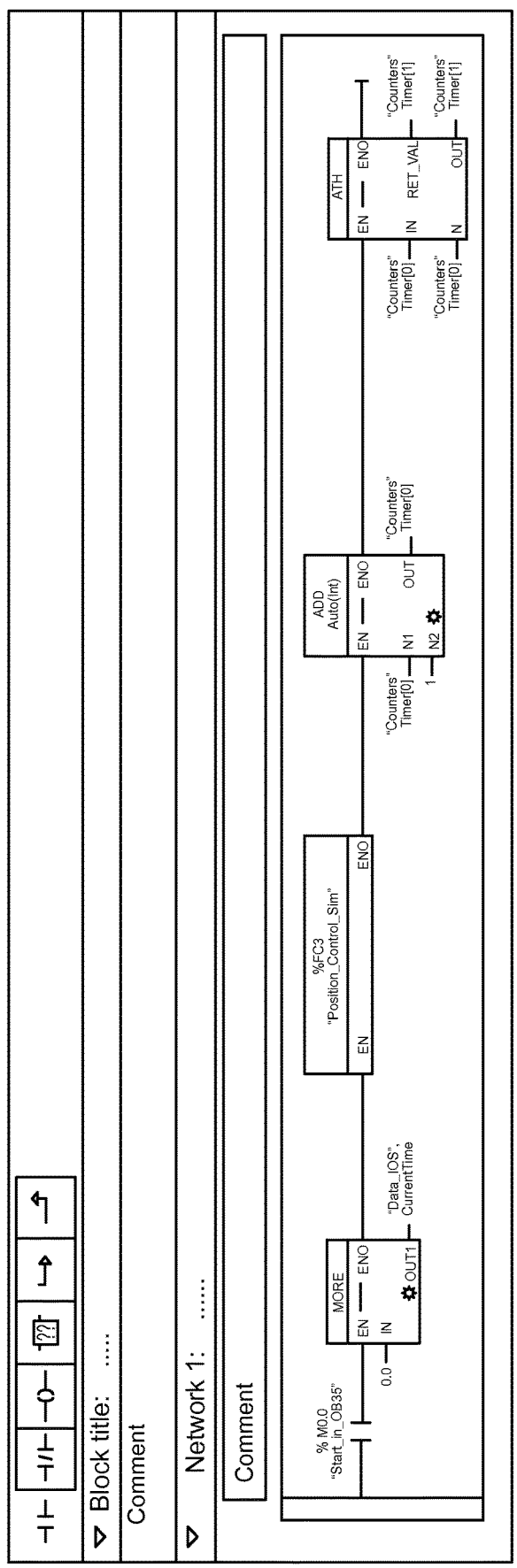
FIG. 5C is a ladder diagram for OB35—a cyclic positioning program executed every 100 ms, as may be used in some embodiments.

FIGS. 5A, 5B, and 5C show the high-level control sequences (OB1, OB100, and OB35) are written in Ladder Logic, as it may be specified in some embodiments. FIG. 5A shows the ladder diagram for OB100—complete restart program. FIG. 5B provides an illustration of the ladder diagram for OB1—main program cycle. FIG. 5C is a ladder diagram for OB35—a cyclic positioning program executed every 100 ms. As shown in FIG. 5C, the position control program block "Position_Control_Sim" receives input(s) from "Move" program block and sends output(s) to "Add" block. The position control is coded in SCL as shown in FIG. 6 below.

Figure 6:
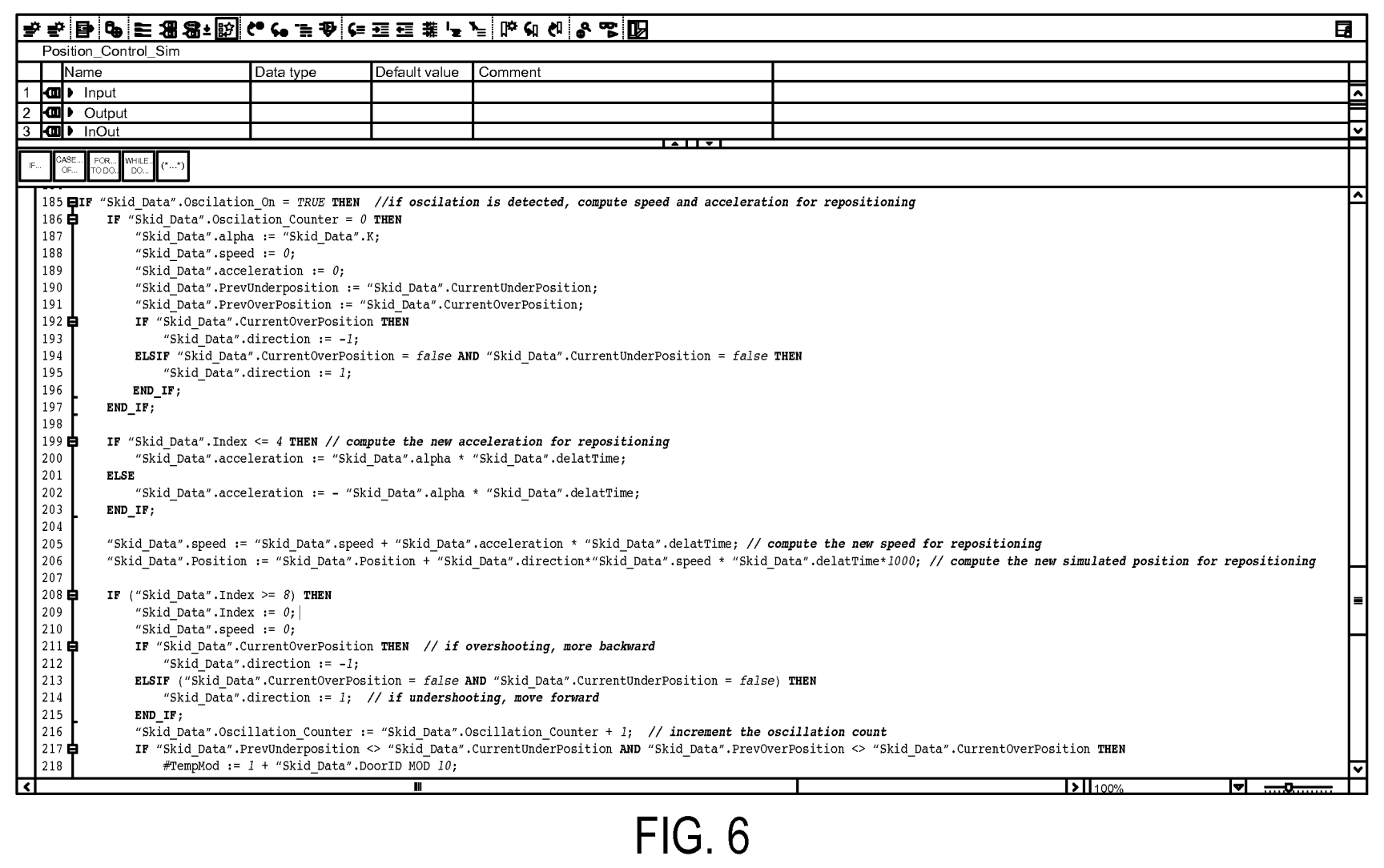

FIG. 6 shows SCL Code for repositioning during oscillations, as it may be implemented in some embodiments. As shown in FIG. 5, a "positioning" program coded in SCL, similar to any other modern programming languages. For example, one or more of the following programming constructs may be utilized: conditions (e.g., IF, ELSE, ELSEIF, THEN, END_IF); loops; comparisons; assignment; and comments.

Figure 7A:
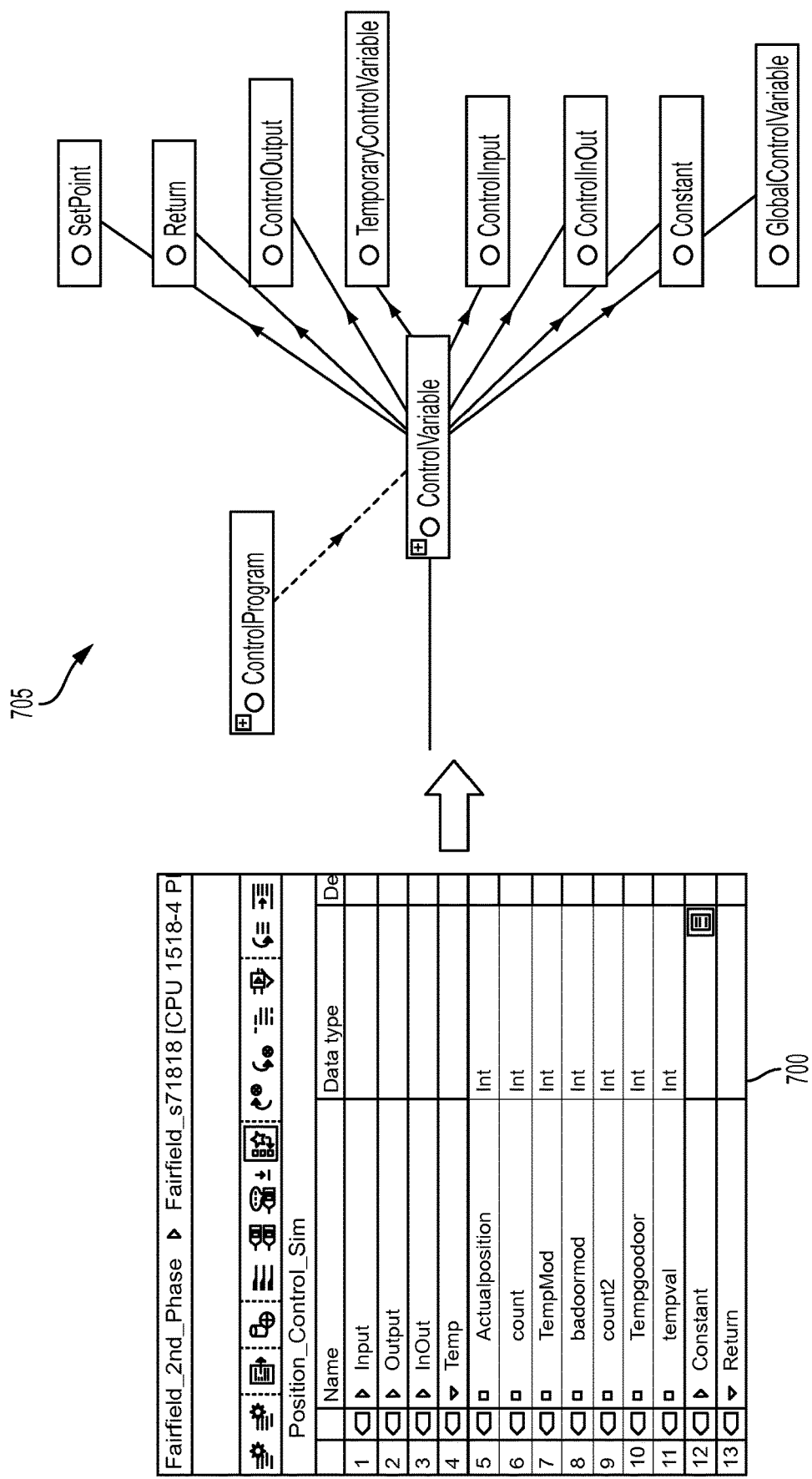
FIG. 7A, a portion of the graphical development environment showing control variables that are the basis for a control context ontology, as may be used in some embodiments.
Figure 7B:
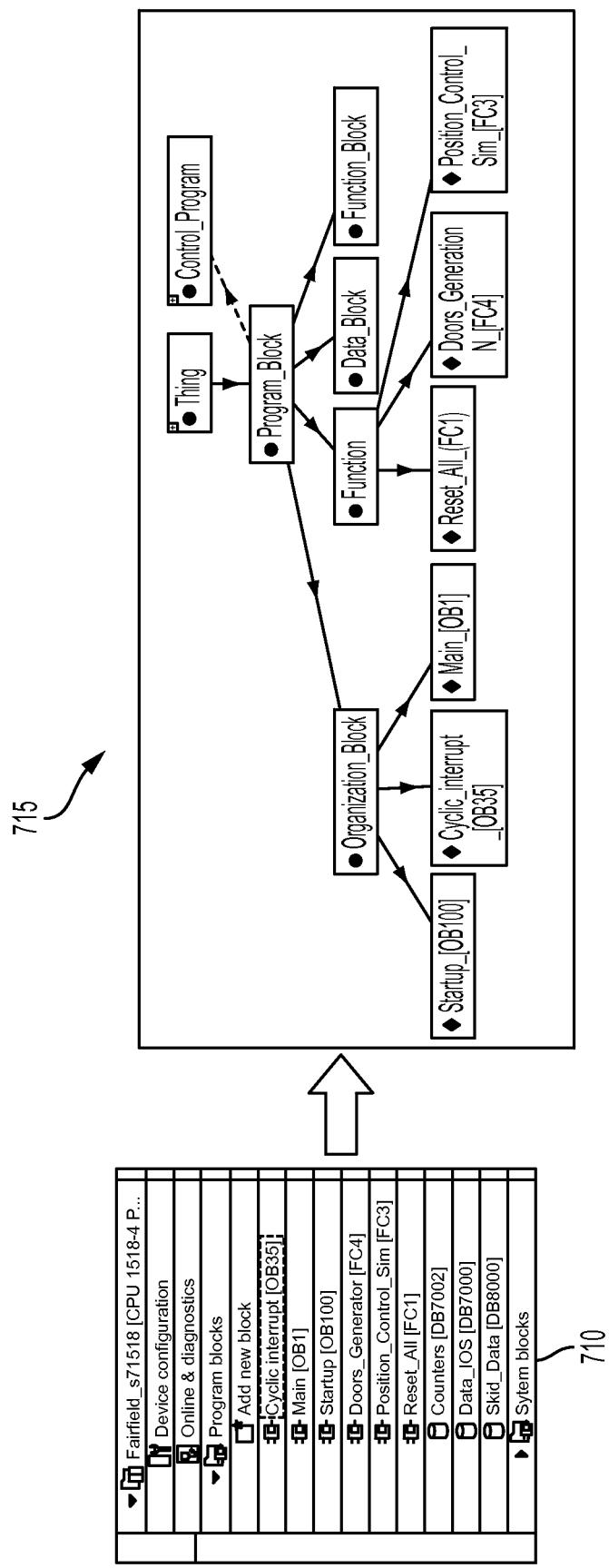
FIG. 7B a portion of the graphical development environment showing set of control functions that are extracted to populate the control context ontology, as may be used in some embodiments.
Figure 7C:
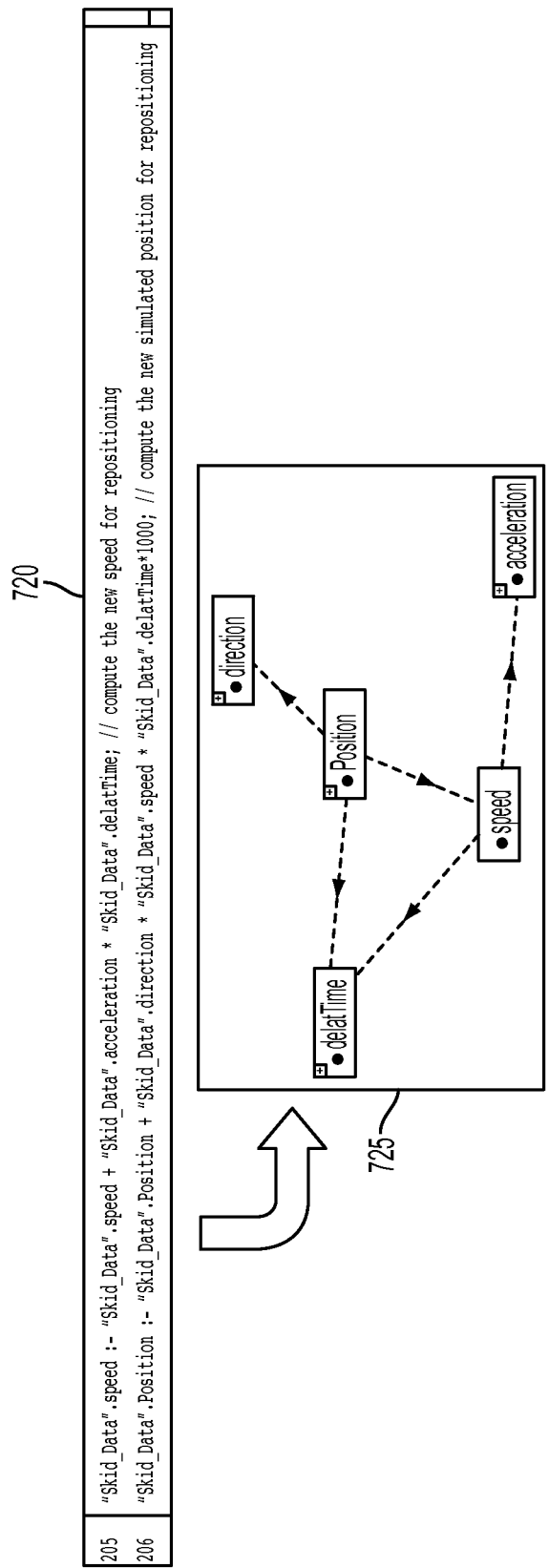
FIG. 7C shows dependency graph representing relations between control variables extracted from the implementation of control function Position_Control_Sim shown in the code snippet, as may be applied in some embodiments.

As shown in the SCL of FIG. 6 and ladder logic program blocks shown in FIGS. 5A-5C, the knowledge of a control program may include information regarding the structure and organization of the program blocks; the relationship between the program blocks (e.g. inputs/outputs, etc.); the control flow of the program blocks (e.g. timer-based cyclic execution); the parameters of the program blocks (e.g. temporary and global variables, etc.); the language constructs within a program block (e.g. loop, comments, etc.); and the dependencies between the variables within the entire control program. This knowledge holds important information of a control program. Such knowledge does not exist anywhere else and may be very hard to reconstruct outside the control program engineering environment. For example, a temporary variable may indicate an abnormality of the control which could be the result of an erroneous sensor reading input. In this example, such knowledge can be used in the later root-cause diagnostics. This knowledge is not preserved during compilation of the control program in a conventional engineering environment. The control code is compiled into the machine code and downloaded and executed on the controller device. The knowledge is lost. However, using the techniques described herein, such knowledge can be preserved in the engineering environment in the form of control models FIGS. 7A-7C show how control context models can be instantiated via the graphical development environment shown in FIGS. 4A-4C by using the control variables of the control program. FIG. 7A, a portion 700 of the graphical development environment (see e.g., FIG. 4B) is shown on the left providing a set of control variables that are the basis for the control context ontology 705 on the right. As discussed above, in addition to the control variables, the control program also contains control functions. For example, in the positioning control program for a body shop door assembly process, the positioning control may consist of the following control functions: Startup [OB100], Reset_All [FC1], Doors_Generator [FC4], Position_Control_Sim [FC3], Main [OB1], etc. In FIG. 7B a portion 710 of the graphical development environment (see e.g., FIG. 4A) is shown on the left providing a set of control functions that are extracted to populate the control context ontology 715 on the right.

By further analyzing the program language constructs (in particular conditions, comparisons and assignments) further dependences between the control variables can be derived and represented formally by means of the explicit relations in the control context model. For example, FIG. 7C shows dependency graph representing relations between control variables 725 extracted from the implementation of control function Position_Control_Sim shown in the code snippet 720. In FIG. 7C, the assignment command allows extracting a dependency relation between the control variables speed, acceleration and deltaTime as well as between position, direction, speed and deltaTime. In this case, the time causality is very simple since it is explicitly given by the sequence of logic control statements. In the case of a closed loop control (e.g., PID) the causal relationship is slightly more complicated because the value of a certain variable is not only dependent on the simultaneous values of other variables but also on the past values of itself and on other variables.

The Control Model describes control variables that directly influence the performance of the control system and therefore also the control KPIs. The types of KPIs that are relevant for a certain application are defined by the type of control system and in many cases can be automatically derived from the context and added to the control context (e.g. in a state-discrete control system programmed with ladder logic, all timing information can be considered as an important KPI). Connecting such alarms (e.g., represented by an event context model) with control KPIs and additional control context information is extremely valuable for alarm management and diagnostics. By traversing the context graph, root causes for alarms can be discovered.

Figure 8A:
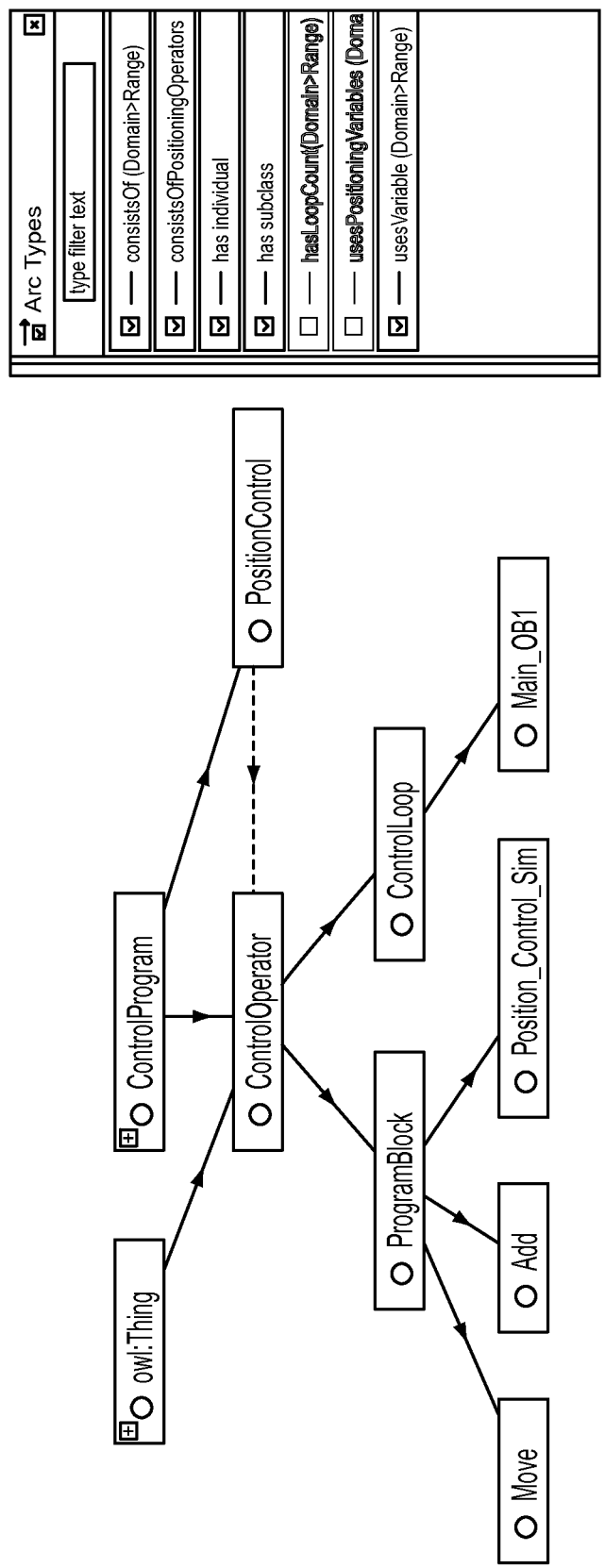
FIG. 8A shows available types of Control Operators available for modeling a Positioning Control, according to some embodiments.

FIGS. 8A-8G provide additional examples of information which may be organized in the Control Model for the door assembly operation, according to some embodiments. FIG. 8A shows available types of Control Operators required for modeling a Positioning Control. In addition to the Control Variables, the Control Program also Control Operators. For our example, the Positioning Control (subclass of Control-Program) may comprise of the following classes/types of Positioning Control Operators: Move, Add, Position_Control_Sim and Main_OB1. A concrete Positioning Control is defined as a Control Program which consists of at least one instance of the Main_OB1 and the Position_Control_Sim operator. This formalization is shown in FIGS. 8B-8G.

Figure 8C:
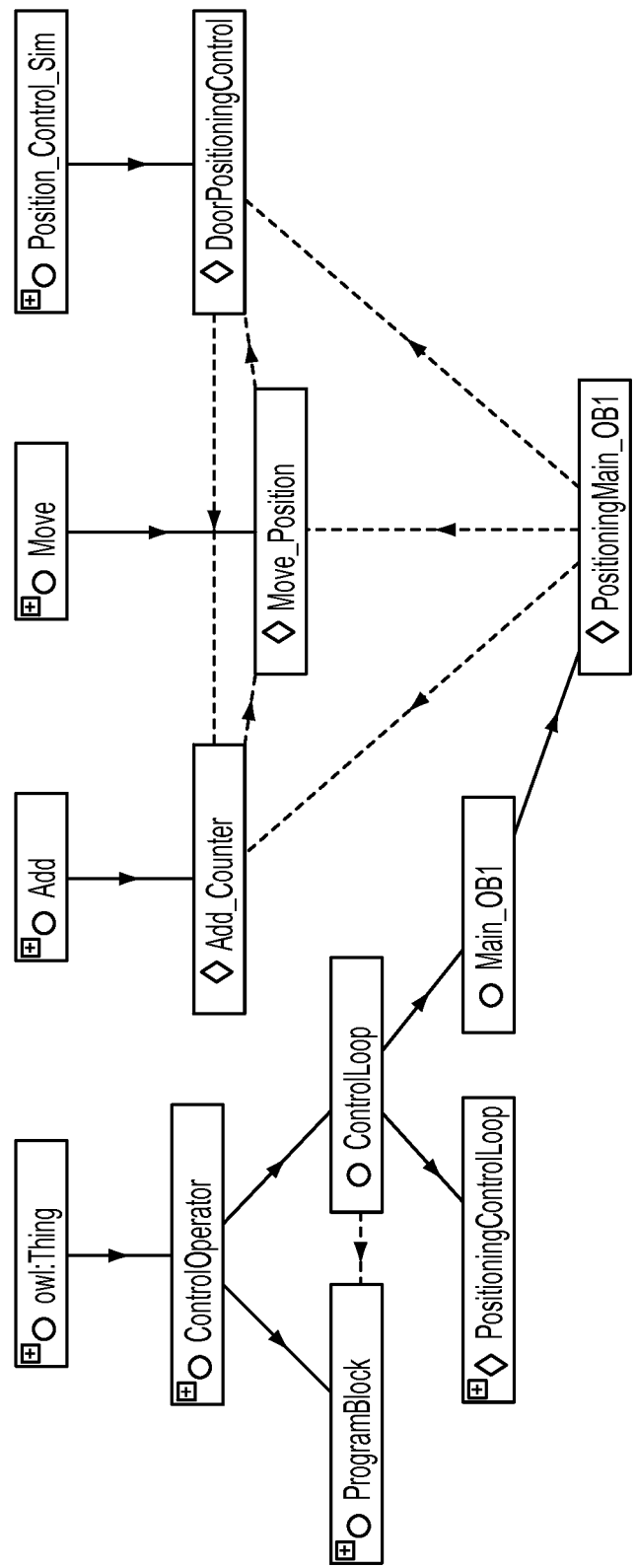
FIG. 8C shows a Concrete instantiation of Main_OB1 for Positioning Control with Control Loop, as may be used in some embodiments.
Figure 8D:
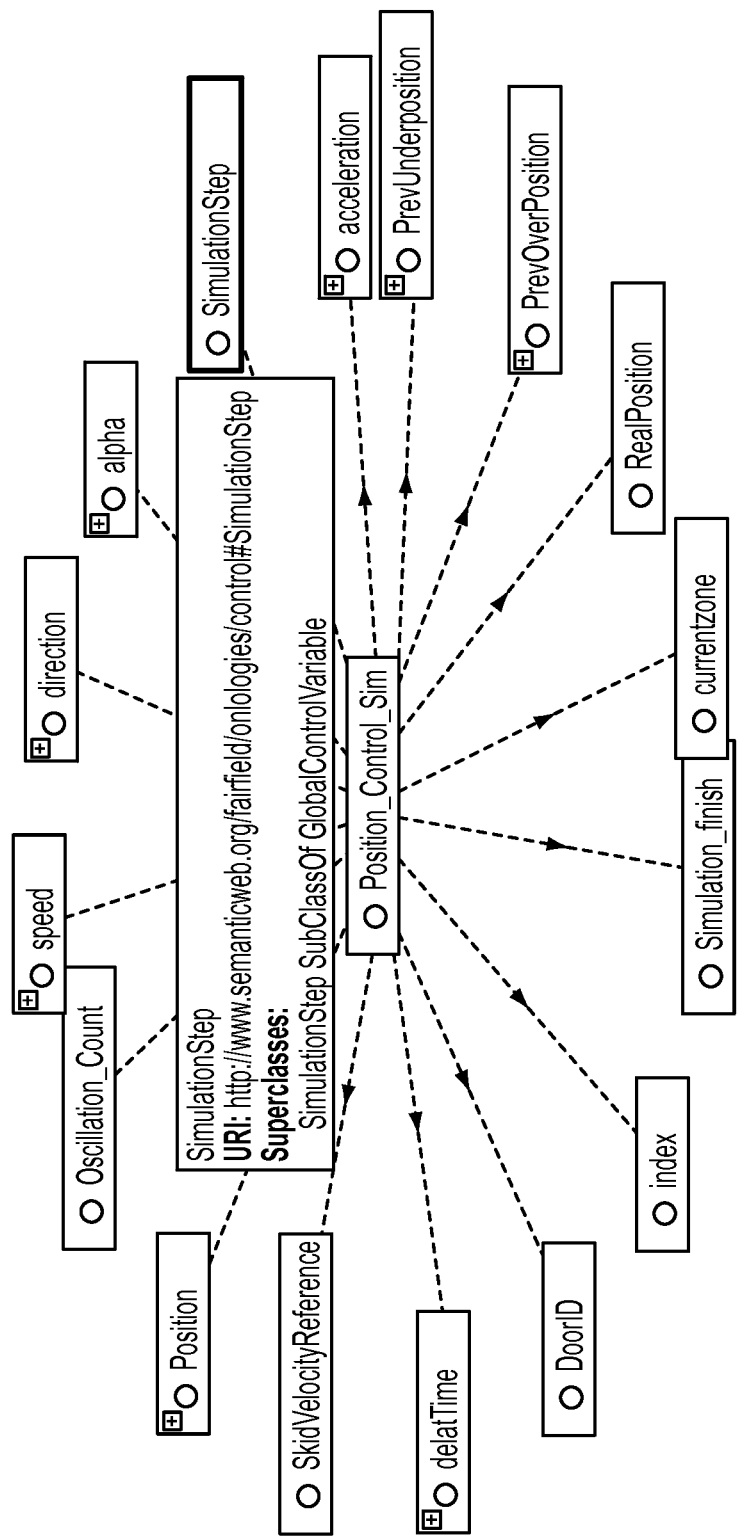
FIG. 8D, which illustrates (Global) Control Variables are used by the Program Block, as may be used in some embodiments.

FIG. 8B shows a formal definition of a Positioning Control program using existential quantification. FIG. 8C shows a Concrete instantiation of Main_OB1 for Positioning Control with Control Loop. The program code of the Position_Control_Sim Program Block can be further modeled as shown in FIG. 8D, which illustrates (Global) Control Variables are used by the Program Block.

Figure 8E:
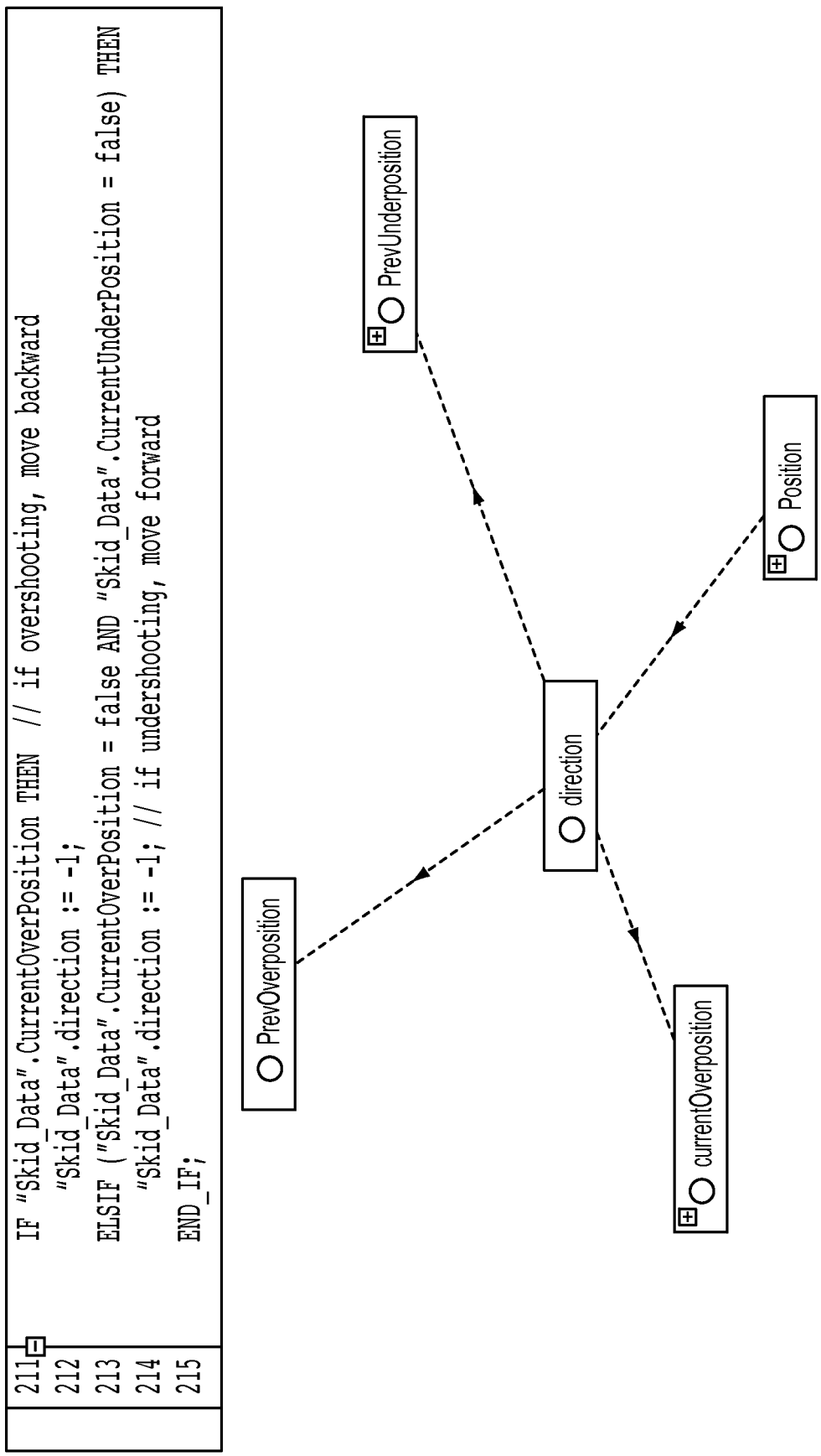
FIG. 8E shows an example for dependsOn-Relations extracted from Program Block Position_Control_Sim (IF-construct), as may be used in some embodiments.

By further analyzing the program language constructs (in particular conditions, comparisons and assignments) further dependences between the Control Variables used in the Program Block can be derived and represented formally by means of the dependsOn-relation in the context model. For example, based on the following program fragment a dependsOn-relation between speed, acceleration and deltaTime as well as a between Position, direction, speed and deltaTime can be extracted. FIG. 8E shows an example for dependsOn-relations extracted from Program Block Position_Control_Sim (IFconstruct).

Figure 8F:
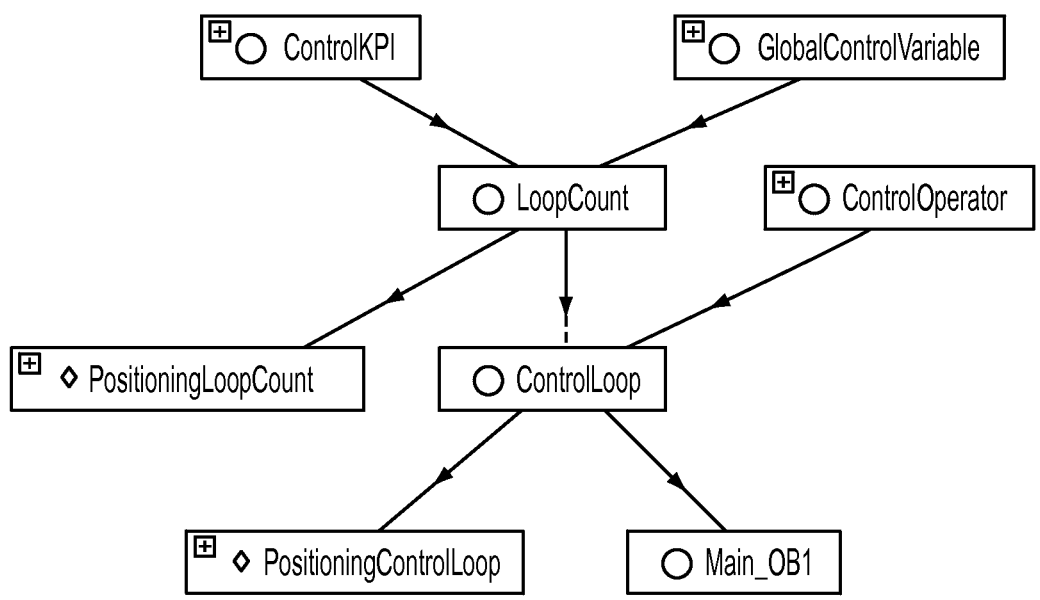
FIG. 8F provides the Control Variable LoopCount used as Control KPI, as may be used in some embodiments.
Figure 8G:
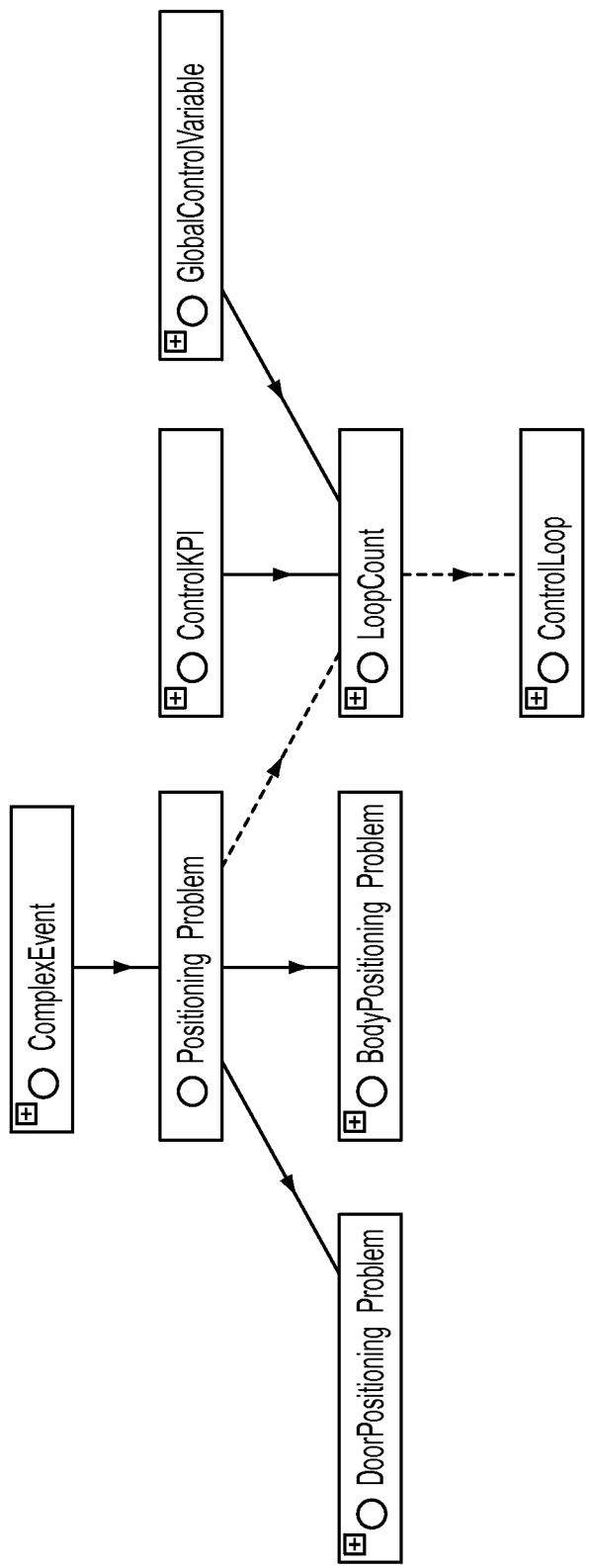
FIG. 8G shows how a Control Variable can be linked to an event in the event model, as may be used in some embodiments.

FIG. 8F provides the Control Variable LoopCount used as Control KPI. Certain Control Variables can be used to assess the quality of the control algorithm. These ControlVariables are referred to herein as ControlKPIs. They are particularly important for monitoring and optimization purposes and can be modeled as follows (using multiple inheritance). The control context model as shortly described above it tightly integrated with other context dimensions (e.g. asset, process and event context). FIG. 8G shows how a Control Variable can be linked to an event in the event model.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method of extracting and applying control contextualization from a control program of an intelligent programmable logic controller, the method comprising:
    executing, by a processor included in the intelligent programmable logic controller, the control program to control operation of devices in an automation system;
    extracting a control model from code of the control program based on context specific knowledge related to the control program, wherein the context specific knowledge includes dependency information relating process variables and variables used by the control program and hidden in a control layer;
    storing, by a storage medium included in the intelligent programmable logic controller, the control model;
    performing root-cause diagnostics for the devices in the automation system using the control model; and
    generating events related to the root-cause diagnostics.

2. The method of claim 1, further comprising:
    using, by a control monitoring component, the control model to perform a monitoring operation related to execution of the control program on the intelligent programmable logic controller
    deploying a monitoring rule for a controller variable using a key performance indicator;
    wherein the monitoring operation comprises monitoring the controller variable during execution of the control program.

3. The method of claim 2, wherein the monitoring operation further comprises:
    monitoring at least one controller function during execution of the control program.

4. The method of claim 1, further comprising:
    identifying at least one fault in the control program using the control model.

5. The method of claim 1, further comprising:
    debugging the control program using the control model.

6. The method of claim 1, further comprising:
    adjusting at least one algorithm included in the control program based on the control model.

7. The method of claim 1, wherein the control model is automatically extracted from program code in an engineering development environment.

8. The method of claim 1, wherein the control model comprises:
    first data comprising structural information related to program functions used by the control program; and
    second data comprising control flow information related to the program functions.

9. The method of claim 1, wherein the control model further comprises: second data comprising key performance indicator (KPI) definitions related to the control program.

10. An article of manufacture for extracting and applying control contextualization from a control program of an intelligent programmable logic controller, the article of manufacture comprising a non-transitory, tangible computer-readable medium holding computer-executable instructions for performing steps comprising:
    utilizing a processor included in the intelligent programmable logic controller to execute the control program to control operation of devices in an automation system;
    extracting a control model from code of the control program based on context specific knowledge related to the control program, wherein the context specific knowledge includes dependency information relating process variables and variables used by the control program and hidden in a control layer;
    storing the control model;
    performing root-cause diagnostics for the devices in the automation system utilizing the control model; and
    generating events related to the root cause diagnostics.

11. The article of manufacture of claim 10, the steps further comprising:
    utilizing the control model to perform a monitoring operation related to execution of the control program on the intelligent programmable logic controller;
    deploying a monitoring rule for a controller variable using a key performance indicator;

wherein the monitoring operation comprises monitoring the controller variable during execution of the control program.

12. The article of manufacture of claim 11, wherein the monitoring operation further comprises:
   monitoring at least one controller function during execution of the control program.

13. The article of manufacture of claim 10, wherein the steps further comprise:
   identifying at least one fault in the control program using the control model.

14. The article of manufacture of claim 10, wherein the steps further comprise:
   debugging the control program using the control model.

15. The article of manufacture of claim 10, wherein the steps further comprise:
   adjusting at least one algorithm included in the control program based on the control model.

16. A programmable logic controller comprising: at least one processor configured to:
   execute a control program according to a scan cycle to control operation of devices in an automation system;
   extract a control model from code of the control program based on context specific knowledge related to the control program, wherein the context specific knowledge includes dependency information relating process variables and variables used by the control program and hidden in a control layer;
   perform root-cause diagnostics for the devices in the automation system utilizing the control model; and
   generate events related to the root-cause diagnostics; and
   a non-volatile computer-readable storage medium storing the control program and the control model.

17. The programmable logic controller of claim 16, wherein the monitoring operation comprises:
   using the control model to perform a monitoring operation related to execution of the control program;
   monitoring at least one controller variable during execution of the control program, and wherein the at least one processor is further configured to deploy a monitoring rule for the at least one controller variable using a key performance indicator.

18. The programmable logic controller of claim 17, wherein the monitoring operation further comprises:
   monitoring at least one controller function during execution of the control program.

19. The programmable logic controller of claim 17, wherein the at least one processor is further configured to:
   adjust at least one algorithm included in the control program based on the control model.

* * * * *